Patented Sept. 16, 1930

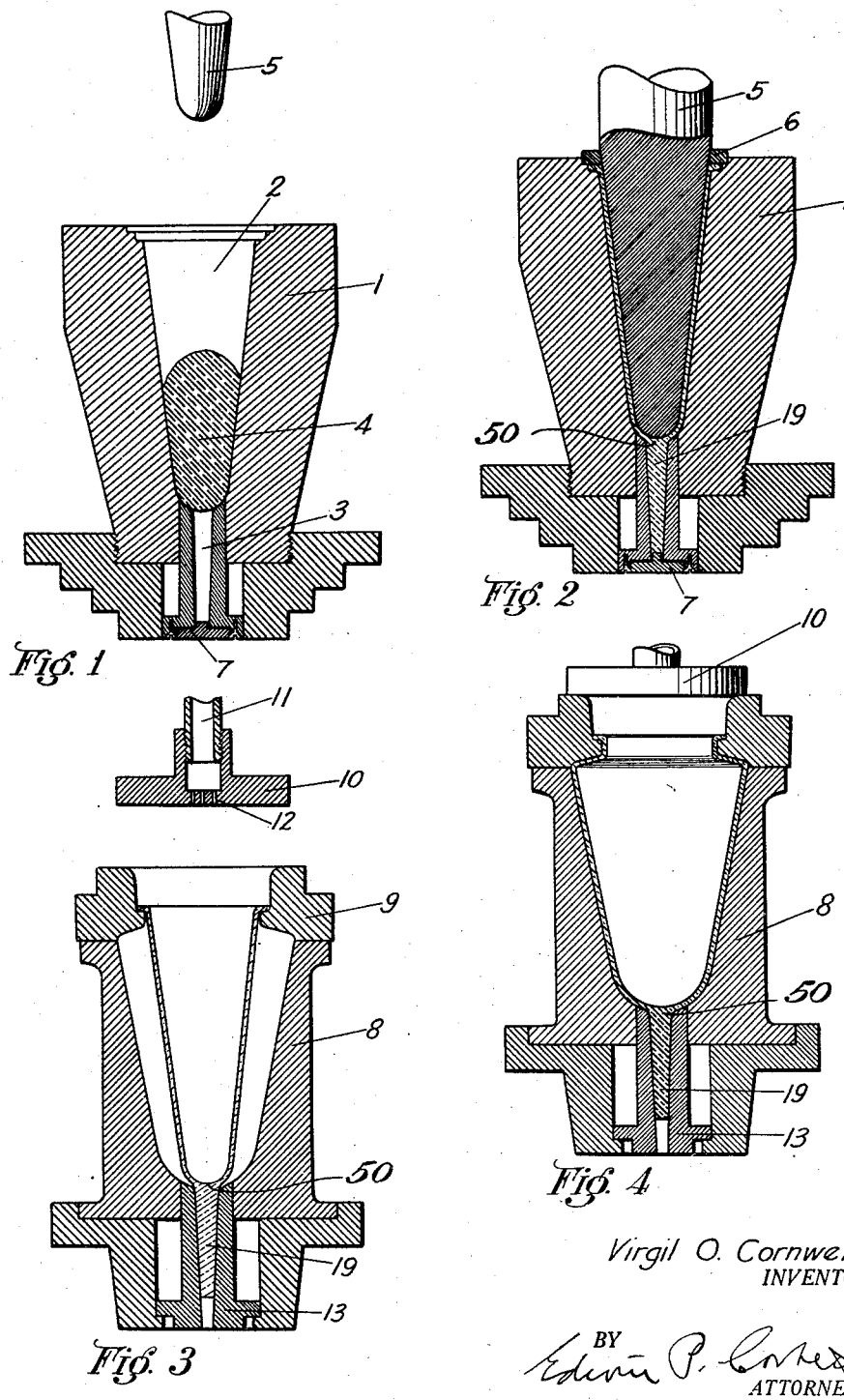

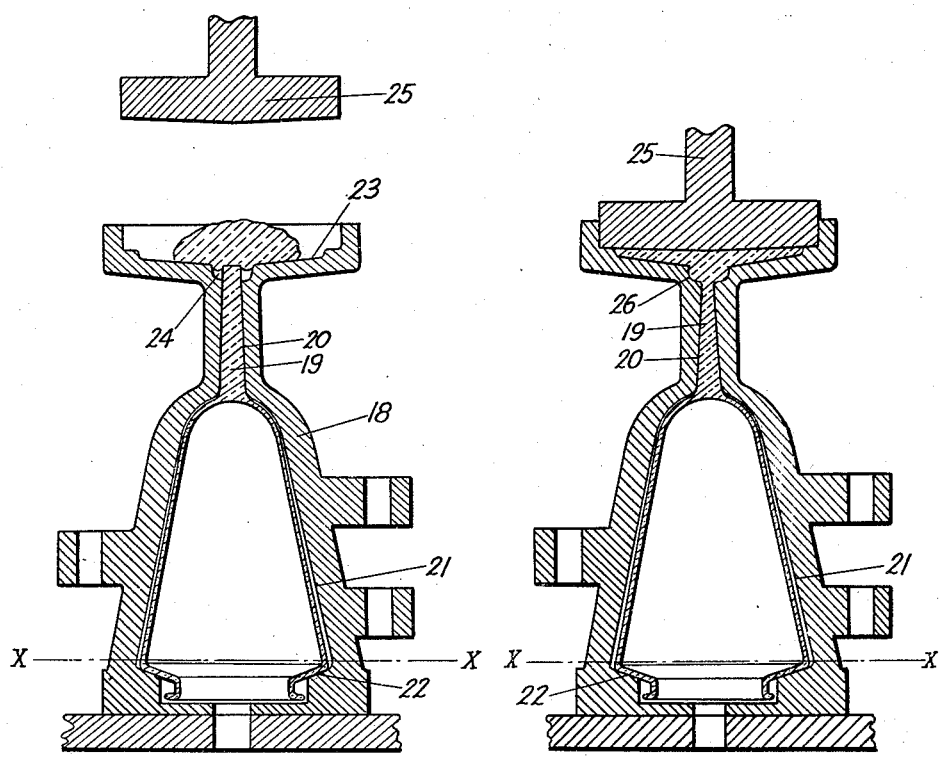
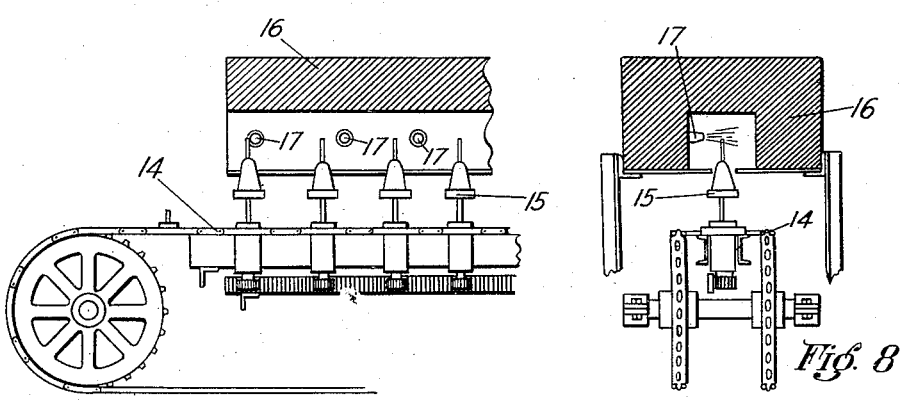

1,775,632

UNITED STATES PATENT OFFICE

VIRGIL O. CORNWELL, OF COLUMBUS, OHIO, ASSIGNOR TO THE FEDERAL GLASS COMPANY, OF COLUMBUS, OHIO, A CORPORATION OF OHIO

MANUFACTURE OF STEMMED AND FOOTED GLASSWARE

Application filed September 19, 1925. Serial No. 57,286.

My invention relates to the manufacture of stemmed and footed glassware and, more particularly, the manufacture of high quality thin-walled goblets, and the like, by pressing and blowing.

Heretofore, in the manufacture of high quality stemmed and footed glassware, such as thin-walled goblets, great skill and care has been necessary in order that the proper shape and finish be imparted thereto. In the manufacture of such glass articles, it is essential that the bowl walls be thin and brilliant and free from marks, yet of such strength and durability as to withstand ordinary use without breakage.

Furthermore, it has been found undesirable to manufacture thin-walled goblets by the well known pressing method for reasons well known to those skilled in the art. In manufacturing goblets by the pressing method, the walls of the article are necessarily thick and lacking in brilliancy. The quality of the ware is very low and unsatisfactory for the uses to which thin-walled goblets are ordinarily put.

Still further, due to the irregular shapes and designs of stemmed and footed glassware, such as goblets, difficulty has heretofore been experienced in manufacturing such ware by machine methods. Also, in attempting to manufacture this kind of glassware by the machine methods, the necessary high quality of the ware is, in most instances, impaired.

Because of the above existing conditions, high quality, thin-walled goblets, and other similar glass articles, have been made almost exclusively by the well known hand method. In the making of thin-walled, stemmed and footed glassware, such as goblets, by the hand method, it is the practice for a hand gatherer to gather a mass of glass on a blowpipe. After the glass has been so gathered, the gatherer marvers the mass to form a tough skin on its outer surface and to give it a preliminary shape. This mass is then further shaped by blowing a puff of air through the blowpipe into the interior of such mass. The mass so shaped and attached to the blowpipe is then usually transferred to another operator who forms an integral stem portion by stretching the mass and so shaping it with suitably provided hand tools. An operator then further shapes the mass by swinging or otherwise manipulating the blowpipe and by further blowing through the blowpipe into the interior of the partially shaped mass. After this latter operation is completed, the partially shaped mass may be termed a blank, and is ready for the blowing operation. This blank is placed in a sectional blow mold and the operator then blows through the blowpipe, at the same time rotating the blowpipe and the glass attached to it in the mold, and blows the glass to the shape of the mold. Upon the completion of this operation, the goblet bowl and stem are completed as integral portions, the goblet bowl being thin-walled. Both the bowl and stem are smooth and free from seams.

The portion of the article so far formed remains attached to the blowpipe, all of which is handed to another operator. Then, still another operator gathers a mass of glass on a rod or punty and manipulates it to form a desired shape. The glass thus gathered and shaped is deposited upon the end of the stem which has already been formed and is severed from the rod or punty. Following this operation, the mass deposited on the stem is shaped by a hand operated tool to form the foot of the article. All of these operations take place in succession and at such times that, when the glass for forming the foot is deposited on the stem, the glass so deposited will readily weld to the stem to form a strong, fixed and durable joint. The article so formed is then detached from the blowpipe and finished ready for packing in the well known manner.

It is thus seen that the making of stemmed and footed glass articles, such as goblets, by the hand method is a tedious and expensive process which depends solely upon the skill of a great number of operators. Uniformity in size, shape, weight and quality are lacking because these factors depend upon the skill, eye and judgment of a number of operators whose skill varies. The rate of production is slow. One of the difficulties to be encountered in making such glass articles by the hand method is that the different steps to be performed by different operators, whose degree of skill may vary, are so co-related that if any one of such operators fails to perform his particular operation properly, the ultimate result to be attained may be defeated.

One of the objects of my invention is to provide for the manufacture of stemmed and footed glass articles, such as goblets, by mechanical means and whereby the human agency is eliminated as a factor in determining the quality of the articles.

Another object of my invention is to provide for the manufacture of high quality, thin-walled glass articles, such as goblets, by pressing and blowing.

Still another object is to provide for the manufacture of successive high quality, thin-walled glass articles which are uniform as to size, shape, weight, and quality.

A further object of my invention is to provide for increasing the rate of production and decreasing the cost of production of high quality, thin-walled glass articles, such as goblets.

Another object is to provide for the manufacture of thin-walled, high quality glass articles, such as goblets, which will serve the purpose as substitutes for the well known blown, high quality, thin-walled glass articles, such as goblets.

My method may consist, generally, in first depositing a mass of glass in a preferably non-sectional blank mold, the blank mold being of such shape as to form a bowl blank and a stem integral therewith. After the mass of glass has been deposited in the blank mold, a pressing plunger, or the like, may be moved into the mold to force the glass into a portion thereof for forming the stem of the article, at the same time, forcing the glass around such plunger to form a bowl blank. In carrying out the foregoing operations, a bowl blank and stem are formed simultaneously and integrally.

Following the steps just set forth, the blank is removed from the blank mold and transferred to a preferably non-sectional blow mold which is so shaped as to receive the already formed stem and which has a bowl portion of such shape as to give the bowl blank its final form. Upon the transfer of the blank to the blow mold, a suitably provided blowhead may be moved into operative relation upon the blow mold to admit air to the interior of the blank to expand the bowl portion of the blank, thus giving it the shape of the interior of the blow mold.

Upon the completion of the preceding step, the formed bowl and stem are removed from the blow mold and may be transferred directly to a sectional mold which is adapted to support the already formed bowl and stem without injury thereto. Furthermore, this sectional mold is of such shape and construction as to embody a foot mold portion.

Upon the transfer of the completed bowl and stem to the last mentioned mold, a mass of glass of the proper size and weight is deposited in the foot mold portion. A pressing plunger may then be moved into such foot mold portion and the glass therein pressed to the shape of the foot mold to form the foot of the article.

I preferably perform the preceding steps automatically in such rapid succession that, when the mass of glass for forming the foot is deposited in the foot mold, such glass and the glass of the formed stem are in proper condition for welding; whereby, when the foot mold plunger is operated to form the foot of the article, the foot will also be welded to the stem. This provides a strong, fixed and durable joint between the stem and foot.

Although I may perform my method in the manner above set forth, yet it may be desirable, in some instances, depending upon the nature of the glass and the conditions of operation, to heat the stem of the article prior to the act of forming and welding the foot thereon. In case that such reheating is found desirable after the bowl and stem have been finally shaped and removed from the blow mold, the stem may be reheated in any desired manner. After this reheating has taken place, the bowl with its reheated stem is placed in the foot mold above referred to, and the operations carried out as herein above set forth.

The practice of my method does not depend upon any particular apparatus. One form of apparatus which I may employ in carrying out my method is shown in the annexed drawings wherein Figure 1 is a vertical section of a blank or press mold with a mass of glass deposited therein, this blank mold being of such shape as to form the bowl blank and stem.

Figure 2 is a view similar to Figure 1 except that the pressing plunger is shown as moved into the mold and the bowl blank and stem formed.

Figure 3 is a vertical sectional view of a blow mold with the blank of Figure 2 in position therein.

Figure 4 is a vertical sectional view of the blow mold of Figure 3 and showing the blowhead in place and the blank expanded to form the bowl of the article.

Figure 5 is a vertical sectional view of the foot mold, showing the bowl and stem formed in Figure 4 in position therein and with a mass of glass deposited in the foot mold portion ready for the operation of the pressing plunger to form and weld the foot of the article.

Figure 6 is a vertical sectional view of the mold of Figure 5 showing the foot mold plunger moved into the foot mold and the foot of the article formed and welded to the stem.

Figure 7 is a partial longitudinal section of a reheating apparatus showing the partially formed article, such as shown in Figure 4, in inverted position on an endless carrier and passing before suitable heating devices.

Figure 8 is a front elevation, partially in section, of the reheating apparatus shown in Figure 7.

Referring particularly to the drawings, I may employ a blank mold 1 which may be of the block mold type and having a bowl blank portion 2 and a stem portion 3. The structure which I have shown in the drawings is particularly adapted to the formation of thin-walled glass articles known as goblets.

In carrying out my method, I preferably deliver glass to the blank mold 1 by automatic glass feeding means, but it is obvious that my method may also be carried out by feeding the glass to the mold by hand. In either case, a mass of glass, designated by the numeral 4 (Figure 1), is first deposited in the blank mold 1 and the pressing plunger 5 is then moved into the mold so as to force the glass into the stem cavity 3 and, at the same time, to force the glass around the plunger 5 to form the bowl blank in the manner shown in Figure 2. A mold ring 6 is preferably carried downwardly with the plunger 5 to assist in the formation of the blank in the well known and ordinary manner. This mold ring also aids in giving the top of the blank such a shape as to facilitate its removal from the blank mold 1. The lower portion of the stem cavity 3 may be provided with a valve 7 which is mounted in such a manner (see Figures 1 and 2) as to permit the escape of air from the stem cavity 3 when the plunger 5 is moved into the mold to force the glass into the stem cavity to form the stem.

It will be understood that various means may be provided for permitting the escape of air from the stem cavity. For instance, the lifting means itself may be provided with clearance spaces to ensure this.

After the bowl blank and stem have been formed integrally, as just described and as shown in Figure 2 of the drawings, the stem mold 3 may be elevated to lift the blow blank and stem, and a suitable transfer device (not shown) may be brought into operation whereby the blank is lifted from the blank mold 1 and transferred and deposited in the blow mold 8, as shown in Figure 3. Any desired form of transfer device may be employed such as an automatically actuated transfer with gripping jaws for gripping the top of the partially formed article.

The blow mold 8 is preferably non-sectional and has a shape identical with the final shape to be given to the bowl of the goblet. The blow mold 8 carries a sectional mold ring 9 of the ordinary type which supports the upper portion of the bowl blank and upon which the blowhead 10 seats.

Upon the deposit of the blank in the blow mold, as shown in Figure 3, the blowhead 10 is moved so as to seat upon the mold ring 9, whereupon fluid pressure is admitted through the pipe 11 and the openings 12 in the blowhead into the interior of the blank and the blank is blown to the shape shown in Figure 4. After this step in the operation is completed, the blowhead 10 is moved away from the mold ring 9 and the mold ring 9 is opened, whereupon the slidable portion 13 of the blow mold 8, which carries the previously formed stem, may be moved upward to raise and facilitate the removal of the formed bowl and stem. The formed bowl and stem are then removed from the blow mold by suitable transfer means adapted to grip and hold the top portion of the thus completed article.

An important feature of my invention resides in the fact that the distance between the bottom of the stem and the bottom of the bowl blank cavity is not substantially decreased during blowing. In other words, the distance between the bottom of the stem and the bottom of the bowl cavity measured on the same article before and after blowing, is substantially the same. I have found that if it is attempted to materially decrease the distance between the bottom of the mold cavity and the end of the stem during blowing, a more or less elongated cavity will form in the stem and produce a defective and unsightly article which is difficult to clean and probably unsalable. I have also found that if it is not attempted to materially decrease the distance between the bottom of the bowl cavity and the end of the stem during blowing, no cavity will form in the stem and the article produced will be properly formed and readily salable. I avoid the formation of a cavity in the stem during blowing by chilling or "setting" the glass at the juncture of the bowl and stem during pressing and then maintaining this chilled or "set" portion of glass in substantially the same position with reference to the blow mold as it had with reference to the press mold. In other words, the portion of glass designated by the numeral 50 in Figures 2, 3 and 4 is chilled or "set" by the lower end of the plunger 5 during pressing and has substantially the same position with relation to the blow mold 8 after blowing as it had with reference to the press mold 1 after pressing.

It may be found desirable to reheat the formed stem before forming and welding the foot thereon. In that event, upon the removal of the bowl and stem from the blow mold 8, such partially completed article is inverted and placed upon the carrier 14 on suitably provided supports 15 in the manner shown in Figure 7. I do not wish to be limited to any particular type of carrier, but I, preferably, employ an endless carrier adapted to carry the articles through the heating chamber 16. As these articles pass through the heating chamber 16, the flames from burners 17, or additional burners if desired, play upon the stems of the articles and reheat them to a point where the foot of the article will readily weld to the stem during the formation of the foot, as hereinafter described.

As each partially formed article emerges from the heated chamber, it is transferred and preferably placed in inverted position in a sectional foot mold 18. The sectional foot mold 18 is of such construction that the stem 19 of the article fits snugly in a stem pocket 20 while the bowl portion does not contact with the interior of the bowl pocket 21 except at the shoulder marked 22. During the final finishing of the article, the bowl is cut off at the portion marked X—X of Figure 5. Therefore, it is obvious that by keeping the bowl of the article out of contact with the walls of the bowl pocket 21, that portion of the bowl which will ultimately form the finished article will not be damaged in any way whatsoever. Furthermore, this provides for an ample support for the inverted and partially finished article during the formation and welding of the foot, without the possibility of injury to the finished article.

The upper portion of the foot mold 18 has a foot mold cavity 23 of the shape to be given the foot of the article. The stem pocket 20 of the foot mold 18 may be slightly less in length than the stem 19 so that the stem may project into a pocket or recess 24 formed in the base of the foot mold cavity 23. The object of this arrangement is to provide for the forcing of the molten glass up around the stem for a predetermined distance during the foot forming operation to form a reinforcement 26 at that point (see Figure 6), and so that, when the stem and foot are welded together, the joint formed will be strong and durable and not liable to breakage under ordinary conditions of use.

When the bowl and stem have been placed in the stem and bowl cavities of the foot mold 18 and the sections of the mold closed, a mass of glass is deposited in the foot mold cavity, as shown in Figure 5, and the foot mold plunger 25 is moved so as to form the foot of the article, as shown in Figure 6. The glass for forming the foot may be fed by automatic glass feeding machinery or by hand, or in any other desired manner.

Upon the completion of the foregoing step in my method, the article, completed in the form shown in Figure 6, is removed from the foot mold 18 and transferred to a point where it is properly annealed. After the article has been formed it may be cracked off along line X—X shown in Figures 5 and 6, and the edges ground and given a heat treatment to make them smooth and even. The article is then in condition for assorting, packing and shipping.

The successive steps of my method are carried out in rapid succession and, although under certain conditions the reheating of the stem may be desirable, yet it is obvious that the step of reheating or remelting may be eliminated and the formed bowl and stem transferred directly from the blow mold 8 to the foot mold 18.

From the foregoing, it is seen that I have provided for the manufacture of thin-walled, stemmed and footed glass articles, such as goblets, by pressing and blowing without lowering the quality of this class of articles. Goblets produced by my method may be readily substituted for the well known thin-walled and hand-blown goblets. It is further obvious that by employing my method, the skill of individual workmen is dispensed with. Also, by employing my invention, the rate of production is greatly increased and the cost of production is decreased without sacrifice of quality. Furthermore, my invention makes possible the manufacture of successive articles of the glass described which are uniform as to shape, weight, size and quality.

Having described my invention, what I claim is:

1. In the method of manufacturing stemmed and footed glass articles, forming a stem and bowl blank by pressing, then forming the bowl by blowing, at the same time, forming a shoulder at the top of the bowl adapted to be removed during the final finishing of the article, transferring said formed bowl and stem in inverted position to a sectional foot mold, supporting said bowl and stem in said foot mold by said shoulder portion only, depositing a mass of glass upon the inverted stem, and pressing to form and weld a foot to said stem to complete the shape of the article.

2. A mold for forming stemmed glassware having a reciprocable stem enclosing portion.

3. A mold for forming stemmed glassware having means for ejecting the formed article by pressure upon the bowl.

4. A press mold for forming hollow articles having extending solid portions comprising a cavity for forming said hollow portion and a reciprocable sleeve member for forming said extending solid portion.

In testimony whereof I hereby affix my signature.

VIRGIL O. CORNWELL.